(12) United States Patent
Shirai et al.

(10) Patent No.: US 6,199,670 B1
(45) Date of Patent: Mar. 13, 2001

(54) ELECTRIC BRAKE APPARATUS FOR CONTROLLING A CURRENT PROVIDED TO A BRAKE MOTOR

(75) Inventors: Kenji Shirai, Mishima; Yasunori Yoshino; Akihiro Otomo, both of Toyota; Eiji Nakamura, Nishikano-gun; Satoru Niwa, Anjo, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/199,648

(22) Filed: Nov. 25, 1998

(30) Foreign Application Priority Data

Dec. 16, 1997 (JP) ...................................... 9-346759
Jun. 25, 1998 (JP) ................................... 10-179191

(51) Int. Cl.[7] ................................................. F16D 65/16
(52) U.S. Cl. ...................... 188/158; 188/181 T; 188/162; 303/20
(58) Field of Search ..................... 188/162, 72.1, 188/181 T, 158–165, 72.7, 72.8; 303/115.2, 162, 122.03–122.07, 20, 152, 3, 191; 180/279, 65.1–65.8, 282, 169, 120, 232; 310/323.03, 321, 323.11, 12, 135, 80; 318/629, 254, 561, 611, 632

(56) References Cited

U.S. PATENT DOCUMENTS

| | | |
|---|---|---|
| 4,944,372 | 7/1990 | Taig . |
| 5,024,299 | 6/1991 | Shaw et al. . |
| 5,107,967 | 4/1992 | Fujita et al. . |
| 5,219,048 | 6/1993 | Shaw et al. . |
| 5,341,077 | * 8/1994 | Chen et al. . |
| 5,432,420 | * 7/1995 | Bahn . |

FOREIGN PATENT DOCUMENTS

| | | |
|---|---|---|
| 4-108058 | 4/1992 | (JP) . |
| 5-22234 | 3/1993 | (JP) . |
| 9814715 | * 4/1998 | (WO) . |

* cited by examiner

Primary Examiner—Douglas C. Butler
(74) Attorney, Agent, or Firm—Kenyon & Kenyon (57) ABSTRACT

An electric brake apparatus generates an appropriate brake force without unnecessarily consuming electric power. The electric brake apparatus has a brake actuator generating a brake force. The brake actuator uses a brake motor system including a brake motor as a power source. A motor current provided to the brake motor is generated under a normal control so as to generate a brake force required for a vehicle. The motor current generated under the normal control is reduced when the brake motor is overheated or when the vehicle is stopped for a long time.

14 Claims, 6 Drawing Sheets

ELECTRIC BRAKE APPARATUS FOR CONTROLLING A CURRENT PROVIDED TO A BRAKE MOTOR

BACKGROUND OF THE INVENTION

1. Field of the Invention

The present invention generally relates to an electric brake apparatus and, more particularly, to an electric brake apparatus which generates a brake force by using a brake motor as a power source.

2. Description of the Related Art

Conventionally, for example, as disclosed in Japanese Laid-Open Utility Model Application No.5-22234, an electric brake apparatus is known. The above-mentioned conventional apparatus includes a disc brake. The disc brake comprises an electrically-driven caliper including a brake motor and a disc rotor rotating with a wheel. The brake motor generates a force to hold the disc rotor by externally provided electric power. Thus, according to the above-mentioned conventional apparatus, a brake force can be generated electrically by appropriately controlling the brake motor.

A driver operating a vehicle may maintain a brake pedal being pressed for a long time when the vehicle is stopped. In this case, according to the above-mentioned conventional apparatus, a large amount of motor current may continuously flow to the brake motor. Additionally, in the above-mentioned conventional apparatus, a large amount of motor current may also continuously flow to the brake motor when a short circuit occurs in an electric circuit, for example due to a collision of the vehicle.

When a vehicle is stopped or after a collision of a vehicle occurs, there is no need to generate a large brake force in the vehicle. In this respect, the above-mentioned conventional apparatus has a problem in that an unnecessarily large amount of electric power is consumed under such a condition.

SUMMARY OF THE INVENTION

It is a general object of the present invention to provide an improved and useful electric brake apparatus in which the above-mentioned problem is eliminated.

A more specific object of the present invention is to provide an electric brake apparatus which generates an appropriate brake force without unnecessarily consuming electric power.

In order to achieve the above-mentioned objects, there is provided according to the present invention an electric brake apparatus having a brake actuator generating a brake force, the brake actuator using a brake motor system including a brake motor as a power source, the electric brake motor comprising:

normal control means for controlling a motor current provided to the brake motor so as to generate a brake force required for a vehicle; and motor current reducing means for reducing the motor current controlled by the normal control means under a predetermined condition.

In the above-mentioned invention, under a normal condition, the motor current is provided to the brake motor so as to generate a brake force required in response to a degree of braking operation by a driver or a moving condition of the vehicle. Accordingly, when a large brake force is required, a large amount of motor current is provided to the brake motor. In this condition, a large brake force is generated with large electric power consumption.

In the present invention, a process for reducing the motor current provided to the brake motor is performed under the above-mentioned condition. When the process for reducing the motor current is performed, a large brake force is not generated but a power consumption is reduced. Accordingly, a superior energy saving characteristic can be achieved by the electric brake apparatus according to the present invention. It should be noted that the normal control means determines a level of the motor current so that a predetermined relationship is established between the motor current and a degree of braking required by the driver as determined by such as a pedal stroke or a pedal pressing force. Additionally, the motor current reducing means sets the level of the motor current smaller than the level determined in accordance with the above-mentioned predetermined relationship.

Additionally, in the electric brake apparatus according to the present invention, the motor current reducing means may reduce the motor current controlled by the normal control means when the brake motor system is in a condition in which an overheat occurs.

In this invention, a process for reducing the motor current is performed when the brake motor system is being excessively heated due to an excessive level of the motor current being provided to the brake motor. Accordingly, the brake motor is prevented from being overheated and an energy saving characteristic of the electric brake apparatus is improved.

In the electric brake apparatus according to the present invention, the motor current reducing means may reduce the motor current controlled by the normal control means when the brake motor is continuously driven for a period exceeding a predetermined period.

When the brake motor is continuously driven for a long time, the brake motor is excessively heated. Accordingly, in this invention, the motor current is reduced when the motor current is continuously provided to the brake motor for a long time so as to prevent the brake motor from being overheated. This results in an improvement of the energy saving characteristic of the electric brake apparatus.

Additionally, in the electric brake apparatus according to the present invention, the motor current reducing means may reduce the motor current controlled by the normal control means when the brake motor is continuously driven for a period exceeding a predetermined period while generating a torque exceeding a predetermined value.

The brake motor generates a large amount of heat as the motor current is continuously driven for a long time or the brake motor generates a larger torque. Accordingly, in this invention, the motor current is reduced when the motor current is continuously provided to the brake motor for a long time while generating a large torque so as to prevent the brake motor from being overheated. This results in an improvement of the energy saving characteristic of the electric brake apparatus.

Additionally, the electric brake apparatus according to the present invention may further comprise temperature detecting means for detecting a temperature of one of the brake motors and a drive circuit driving the brake motor, and wherein the motor current reducing means may reduce the motor current controlled by the normal control means when the temperature of one of the brake motor and the drive circuit is equal to or greater than a predetermined value.

In this invention, the motor current is reduced when the temperature of the brake motor or the drive circuit is excessively high. When the motor current is reduced in such a condition, the brake motor is positively prevented from being overheated and an energy saving characteristic of the electric brake apparatus is improved.

Additionally, the electric brake apparatus according to the present invention may further comprise stopped state determining means for determining whether or not the vehicle is in a stopped state, and wherein the motor current reducing means may reduce the motor current controlled by the normal control means when the vehicle is determined to be in the stopped state.

In this invention, the process for reducing the motor current is performed when it is determined that the vehicle is in a stopped state. When the vehicle is being stopped, there is no need to generate a large brake force exceeding a brake force by which the vehicle can be maintained in the stopped state. In the present invention, the motor current is reduced so that the brake force for maintaining the stopped state is maintained. Thus, the vehicle can be maintained in the stopped state without influencing a behavior of the vehicle and a superior energy saving characteristic can be achieved.

Additionally, the electric brake apparatus according to the present invention may further comprise motor current increasing means for increasing the motor current being provided to the brake motor when the vehicle is not in the stopped state in a condition in which the motor current is reduced by the motor current reducing means.

According to the above-mentioned invention, if the vehicle starts to move while the process for reducing the motor current is performed, a process for increasing the motor current is performed. When the vehicle starts to move unintentionally, the vehicle must be stopped immediately. Accordingly, if the motor current being reduced is increased, a brake force exceeding a brake force sufficient for maintaining the vehicle in the stopped state can be generated. Thus, the vehicle which starts to unintentionally move can be stopped in a short time.

Additionally, in the electric brake apparatus according to the present invention, the brake motor system may include a plurality of brake motors, and the motor current reducing means may reduce the motor current provided to a part of the plurality of brake motors.

In this invention, the reduced motor current is provided to a limited number of the brake motors.

Further, the electric brake apparatus according to the present invention may further comprise collision detecting means for detecting a collision of the vehicle, and the motor current reducing means cuts the motor current when a collision of the vehicle is detected.

In this invention, when a collision of the vehicle is detected, a process for cutting the motor current is performed. After a collision of the vehicle occurs, the motor current is not needed to be provided to the brake motor. Accordingly, electric power is prevented from being unnecessarily consumed by cutting the motor current after a collision of the vehicle is detected.

Other objects, features and advantages of the present invention will become more apparent from the following detailed description when read in conjunction with the accompanying drawings.

DETAILED DESCRIPTION OF THE PREFERRED EMBODIMENTS

Figure 1:
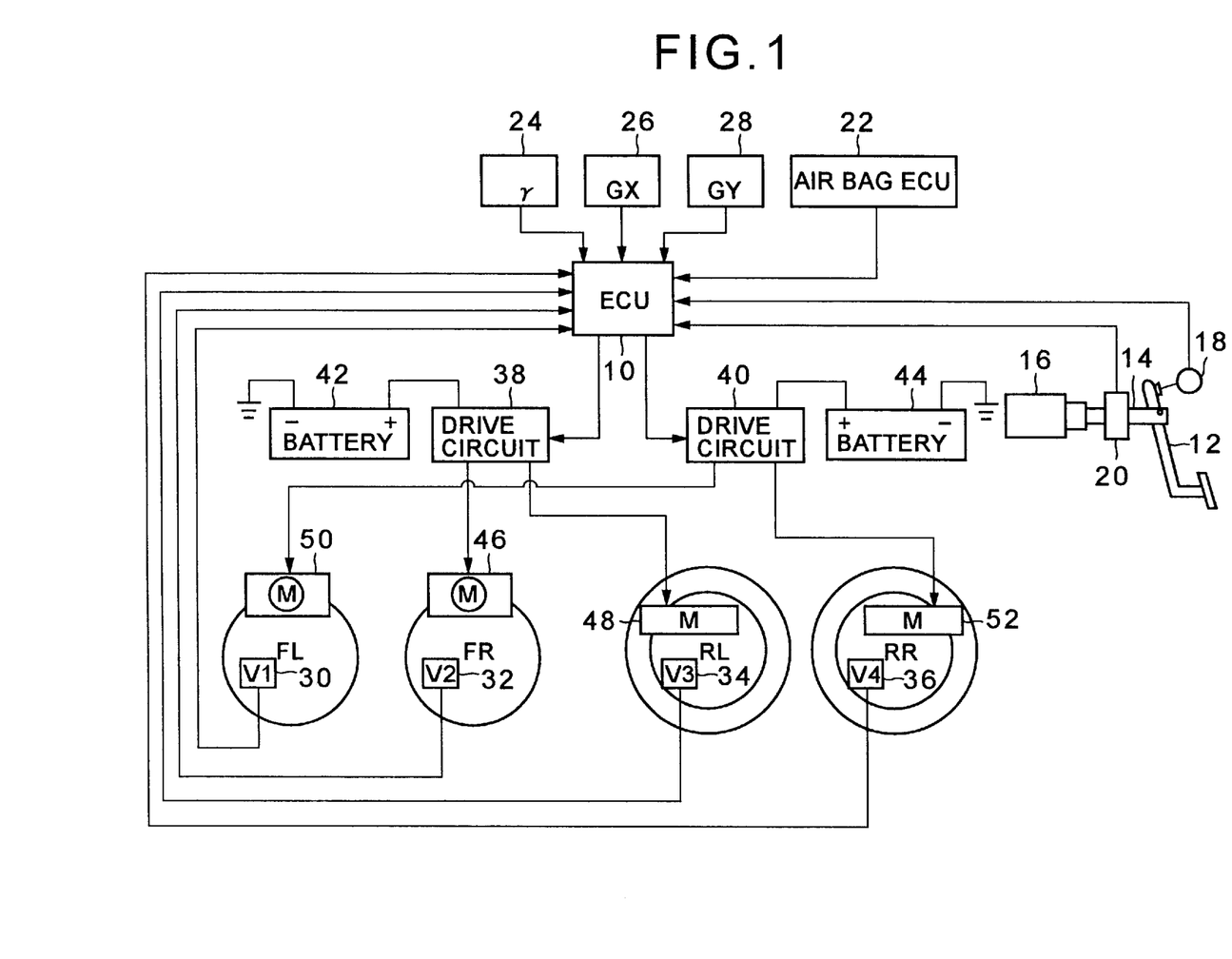
FIG. 1 is a system structure diagram of an electric brake apparatus according to a first embodiment of the present invention.

FIG. 1 shows a system structure diagram of an electric brake apparatus according to a first embodiment of the present invention. The electric brake apparatus according to the present embodiment has an electronic control unit 10 (hereinafter, referred to as ECU 10). The electric brake apparatus generates a brake force corresponding to a degree of operation of a brake pedal by being controlled by the ECU 10.

The electric brake apparatus according to the present embodiment comprises a brake pedal 12. The brake pedal 12 is connected to a stroke simulator 16 via an operational shaft 14. When the brake pedal 12 is pressed by a driver, the operational shaft 14 enters the stroke simulator 16. The stroke simulator 16 generates a reaction force corresponding to a displacement of the operational shaft 14. Accordingly, a reaction force corresponding to a pedal stroke (S) is exerted on the brake pedal 12.

A pedal switch 18 is provided near the brake pedal 12. The pedal switch 18 is turned off when the brake pedal is not pressed, and outputs an ON signal when the brake pedal 12 is pressed. The output signal of the pedal switch 18 is provided to the ECU 10. The ECU 10 determines whether or not a braking operation is performed based on the output signal of the pedal switch 18.

A stroke sensor 20 is provided to the operational shaft 14. The stroke sensor 20 outputs an electric signal corresponding to the pedal stroke S. The output signal of the stroke sensor 20 is provided to the ECU 10. The ECU 10 detects the pedal stroke S based on the output signal of the stroke sensor 20.

An air bag ECU 22 is connected to the ECU 10. The air bag ECU 22 is an electronic control unit for sending an instruction to inflate an air bag by detecting a collision of the vehicle. In the present embodiment, an air bag inflation instructing signal generated by the air bag ECU 22 is provided to the ECU 10. The ECU 10 detects a collision of the vehicle by receiving the air bag inflation instructing signal.

A yaw rate sensor 24, a longitudinal acceleration sensor 26 and a transverse acceleration sensor 28 are connected to the ECU 10. The yaw rate sensor 24 outputs an electric signal corresponding to a yaw rate $\gamma$ of the vehicle. The longitudinal acceleration sensor 26 generates an electric signal corresponding to an acceleration GX with respect to a longitudinal direction of the vehicle, and the transverse acceleration sensor 28 generates an electric signal corresponding to an acceleration GY with respect to a direction of a width of the vehicle. The ECU 10 detects a moving condition of the vehicle based on the output signals of these sensors.

Vehicle speed sensors 30, 32, 34 and 36 are connected to the ECU 10. The vehicle speed sensors 30, 32, 34 and 36 are provided to a left front wheel FL, a right front wheel FR, a left rear wheel RL and right rear wheel RR, respectively. Each of the vehicle speed sensors 30, 32, 34 and 36 outputs a pulse signal at a period corresponding to a speed Vi (i=1, 2, 3, 4) of each wheel. The ECU 10 detects a vehicle speed SPD of the vehicle based on the speed Vi of each wheel.

Further, drive circuits 38 and 40 are connected to the ECU 10. A positive terminal of a first battery 42 is connected to the drive circuit 38, and a positive terminal of a second battery 44 is connected to the drive circuit 40. Additionally, a brake motor 46 provided to the right front wheel FR and a brake motor 48 provided to the left rear wheel RL are connected to the drive circuit 38. On the other hand, a brake motor 50 provided to the left front wheel FL and a brake motor 52 provided to the right rear wheel RR are connected to the drive circuit 40.

The drive circuits 38 and 40 are circuits for driving the brake motors 46 to 52 by using the first battery 42 and the second battery 44 as a power source. The drive circuits 38 and 40 can control the brake motors 46 to 52 on an individual basis in response to an instruction signal provided by the ECU 10.

The left and right front wheels FL and FR are provided with disc brakes using the brake motors 46 and 50 as a power source, respectively. Additionally, the left and right rear wheels RL and RR are provided with drum brakes using the brake motors 48 and 52 as a power source, respectively. Each of the disc brakes and the drum brakes generates a brake force corresponding to an operational state of the respective brake motors 46 to 52.

Each of the brake motors 46 to 52 comprises an ultrasonic motor. That is, each of the brake motors 46 to 52 includes a plurality of PZT elements and a rotor. The PZT elements contract and expand so as to generate a rotating wave. The rotor is rotated by the rotating wave generated by the PZT elements. The rotor of each of the brake motors 46 to 52 is stopped rotating due to a frictional force exerted on the rotor when the PZT elements are not actuated, that is, when a motor current is not provided. Additionally, when the motor current is provided to the PZT elements, a rotational torque corresponding to the motor current is generated in the rotor.

Each of the disc brakes provided to the left and right front wheels FL and FR and the drum brakes provided to the left and right rear wheels RL and RR is provided with brake pads and a transfer mechanism for transferring a rotational movement of the brake motors 46 to 52 to a displacement of the brake pads. According to the above-mentioned transfer mechanism, when a motor current is provided to each of the brake motors 46 to 52, a pressing force corresponding to the motor current can be transmitted to the brake pads. Additionally, according to the above-mentioned transfer mechanism, when the motor current is not provided to the brake motors 46 to 52, the brake pads can be held at positions before the supply of the motor current is stopped.

When the pressing force is transmitted to each of the brake pads, each of the disc brakes provided to the left and right front wheels FL and FR and the drum brakes provided to the left and right rear wheels RL and RR generates a brake force corresponding to the pressing force. After the brake pads are held at positions where an appropriate brake force is generated, the brake force is maintained. Accordingly, each of the above-mentioned disc brakes and drum brakes generates a brake force corresponding to the motor current when the motor current is provided to each of the brake motors 46 to 52, and maintains the brake force after the motor current is stopped when the brake force is generated.

In the present embodiment, the ECU 10 determines a brake force required by a driver based on the pedal stroke S when the brake pedal 12 is pressed. Then, the ECU 10 controls each of the brake motors 46 to 52 so that a brake force equal to the determined brake force is generated in the vehicle and so that a ratio of a brake force of the front wheels to a brake force of the rear wheels becomes a predetermined ratio. Thus, according to the electric brake apparatus of the present embodiment, an appropriate brake force corresponding to a braking operation of the driver can be generated in each of the front wheels and the rear wheels.

Additionally, in the present embodiment, the ECU 10 performs brake force controls such as a known antilock brake control (hereinafter, referred to as ABS control) or a known vehicle attitude control (hereinafter, referred to as VSC control). The brake force controls can be achieved by calculating a target brake force to be generated by each wheel in response to a moving condition of the vehicle and controlling the brake motors 46 to 52 so that the brake force generated by each wheel is equal to the target brake force.

The driver of the vehicle may maintain the brake pedal 12 being pressed so as to maintain the vehicle at a stopped state. In such a condition, there is no need to generate a large brake force exceeding a brake force required (hereinafter, referred to as a stop maintaining brake force) for maintaining the vehicle at the stopped state. However, in such a condition, a driver may unnecessarily press the brake pedal with strength.

The ECU 10 controls the motor current based on the pedal stroke S. Accordingly, if the brake pedal 12 is pressed strongly, an unnecessarily large motor current may be provided to each of the brake motors 46 to 52. The electric brake apparatus according to the present embodiment has a first feature in that the motor current is controlled to be a minimum current when it is recognized that the vehicle is stopped so as to prevent a unnecessary power consumption when the above-mentioned state continues.

In the electric brake apparatus of the present embodiment, the drive circuit 38 is provided with a control circuit for controlling a motor current (hereinafter, referred to as IM(FR)) provided to the brake motor 46 and another control circuit for controlling a motor current (hereinafter, referred to as IM(RL)) provided to the brake motor 48. Similarly, the drive circuit 40 is provided with a control circuit for controlling a motor current (hereinafter, referred to as IM(FL)) provided to the brake motor 50 and another control circuit for controlling a motor current (hereinafter, referred to as IM(RR)) provided to the brake motor 52.

In the system of the present embodiment, for example, if a short circuit occurs in these circuits due to a collision of the vehicle, an excessive motor current IM(\*\*) (\*\*: FL, FR, RL, RR) may be provided to the brake motors 46 to 52. In the present embodiment, the drive circuits 38 and 40 are provided with relay units between each of the above-mentioned control circuits and the corresponding brake motors 46 to 52. The electric brake apparatus according to the present embodiment has a second feature in that an excessive motor current IM(\*\*) is prevented from flowing to the brake motors 46 to 52, when a collision of the vehicle is detected, by setting the above-mentioned relay unit to an interrupting state.

A description will now be given, with reference to FIG. 2, of a process for achieving the above-mentioned characteristic functions.

Figure 2:
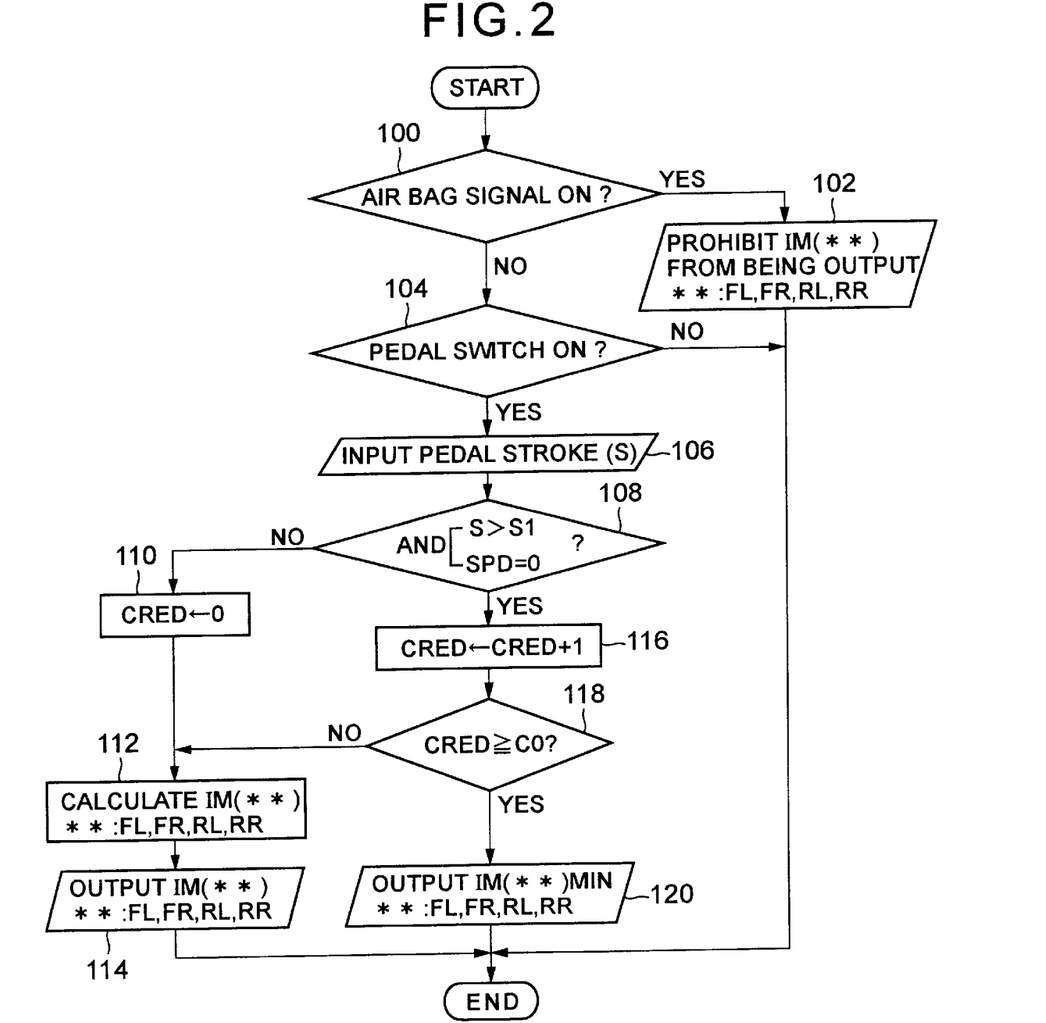
FIG. 2 is a flowchart of a main routine performed by the electric brake apparatus shown in FIG. 1.

FIG. 2 is a flowchart of a main routine performed by the ECU 10 so as to achieve the first and second features. The routine shown in FIG. 2 is a periodic interruption routine started every predetermined time. When the routine shown in FIG. 2 is started, the process of step 100 is performed first.

In step 100, it is determined whether or not an air bag inflation instruction signal issued by the air bag ECU 22 is received. The air bag inflation instruction signal is output when a collision of the vehicle occurs and an inflation of the air bag is required. Accordingly, when the air bag inflation instruction signal is received, it can be determined that there is a possibility of a failure causing an excessive motor current IM(**) to be provided to the drive circuits 38 and 40. If such a determination is made in step 100, the process of step 102 is performed subsequently.

In step 102, a process for prohibiting an output of the motor current IM(**) is performed. Specifically, a process for interrupting the relay units provided in the drive circuits 38 and 40 is performed. After the process of step 102 is performed, the supply of the motor current to the brake motors 46 to 52 is prohibited. After the process of step 102 is completed, the routine at this time is ended.

In the system of the present embodiment, when the supply of the motor current IM() is stopped in a condition in which an appropriate brake force is generated, the brake mechanism provided to each wheel maintains the brake force achieved before the supply of the motor current IM() is stopped. Thus, according to the above-mentioned process of step 102, an excessive motor current IM(**) is positively prevented from flowing to the brake motors while the brake force before a collision of the vehicle occurs is maintained. Thus, according to the electric brake apparatus of the present embodiment, when a collision of the vehicle occurs, an unnecessary power consumption can be positively prevented while maintaining a necessary brake force.

During execution of the present routine, if it is determined, in step 100, that the air bag inflation instruction signal is not received, the process of step 104 is performed subsequently.

In step 104, it is determined whether or not the pedal switch 18 is outputting an ON signal. As a result, if it is determined that pedal switch 104 is not outputting the ON signal, it can be determined that a braking operation is not being performed. In this case, the routine at this time is ended without performing any process. On the other hand, if it is determined that the pedal switch 18 is outputting the ON signal, the process of step 106 is then performed.

In step 106, the pedal stroke S is detected based on an output signal of the stroke sensor 20.

In step 108, it is determined whether or not ① the pedal stroke S exceeds a predetermined value S1 and ② a vehicle speed SPD is equal to "0". The predetermined value S0 is a pedal stroke to generate a stop-maintaining brake force necessary for maintaining the vehicle in the stopped state. It should be noted that in the present embodiment, the stop maintaining brake force is set to a value at which a vehicle can maintain the stopped state at a maximum slope (for example, a slope of 30%).

The brake motor 46, 48, 50 and 52 are designed for continuously providing a motor current IM() to generate the above-mentioned stop-maintaining brake force IM() (hereinafter, referred to as a minimum motor current IM() MIN). Accordingly, if it is determined that the above-mentioned condition ① is not established, it can be determined that the motor current IM() corresponding to the pedal stroke S can be continuously provided to the brake motors 46 to 52 without causing over-heating.

Additionally, if the above-mentioned condition ① is not established, it can be determined that an unnecessary power consumption cannot occur even when the motor current IM() corresponding to the pedal stroke S is provided to the brake motors 46 to 52. Accordingly, if the above-mentioned condition ① is not established, it can be determined that no problem happens even when the motor current IM() is maintained at a value corresponding to the pedal stroke S. If such a determination is made in step 108, the process of step 110 is performed subsequently.

Additionally, if it is determined that the above-mentioned condition ② (SPD=0) is not established, it can be determined that the vehicle is moving. When the vehicle is moving, it is appropriate to generate a brake force corresponding to the pedal stroke S. Accordingly, if the condition ② is not established, it can be determined that the motor current IM(**) is maintained at the value corresponding to the pedal stroke S. If such a determination is made in step 108, the process of step 110 is performed subsequently, similar to the case when the above-mentioned condition ① is not established.

In step 110, a process for resetting a decreasing counter CRED to "0" is performed. The decreasing counter CRED is a counter for counting continuous time during which the condition of step 108 (the condition ① and the condition ②) is continuously established.

In step 112, the motor current IM() to be provided to the brake motors 46 to 52 is calculated. In step 112, the motor current IM() is calculated based on the pedal stroke S.

In step 114, a process for providing the motor current calculated in step 112 to the brake motors 46 to 52 is performed. When the process of step 114 is performed, the brake mechanism of each wheel generates a brake force corresponding to the pedal stroke S. After the process of step 114 is completed, the routine at this time is ended.

According to the above-mentioned process, when the pedal stroke S is less than the predetermined value S0 or when the vehicle is moving, a brake force corresponding to a degree of braking operation by the driver can be generated.

During execution of the present routine, if it is determined, in step 108, that both the condition ① (S>S0) and the condition (SPD=0) are established, it can be determined that an unnecessarily large braking operation is performed by the driver after the vehicle is stopped. If such a determination is made in step 108, the process of step 116 is performed subsequently.

In step 116, a process of increasing the counter CRED is performed. According to this process the decrease counter CRED counts an elapsed time after the condition of step 108 is established.

In step 118, it is determined whether or not the count value of the decrease counter CRED reaches a predetermined value C0. As a result, if it is determined that CRED≧C0 is not established, the process of step 112 is performed subsequently. On the other hand, if it is determined that CRED≧C0 is established, the process of step 120 is performed subsequently.

In step 120, a process for providing the minimum motor current IM()MIN to each of the brake motors 46 to 52 is performed. The minimum motor current IM()MIN is the minimum current needed to obtain the stop-maintaining brake force as mentioned above. After the process of step 120 is performed, the brake mechanism of each wheel generates the stop-maintaining brake force. After the process of step 120 is completed, the routine at this time is ended.

According to the above-mentioned process, when the driver unnecessarily maintains a large degree of braking operation for a long time after the vehicle is stopped, the motor current IM() can be forcibly reduced to the minimum motor current IM()MIN. Thus, according to the electric brake apparatus of the present embodiment, a vehicle can be maintained at a stopped state without consuming power unnecessarily.

Additionally, according to the above-mentioned process, when the vehicle is changed from the stopped state to a moving state under a condition in which the driver is pressing the brake pedal, the motor current IM() can be changed from the minimum motor current IM()MIN to a normal value. Thus, according to the electric brake apparatus of the present embodiment, when for example a stopped vehicle is struck from behind, the stopped vehicle, being unintentionally moved, can be rapidly stopped by increasing the motor current IM() provided to the brake motors 46 to 52**.

Additionally, in the present embodiment, the drive circuits 38 and 40 can individually control each of the brake motors 46 to 52 according to an instruction signal provided by the ECU 10. Accordingly, the minimum motor current IM()MIN is provided to the brake motors 46 to 52** in the following order ① to ④ for each predetermined period. It should be noted that this control is performed so that there is no influences to the brake force controls such as the above-mentioned ABS control or the VSC control are unaffected.

① being provided to the brake motors 46 and 50 provided to the left and right front wheels FL and FR, respectively. ② being provided to the brake motors 48 and 52 provided to the left and right rear wheels RL and RR, respectively. ③ being provided to the brake motors 46 and 48 provided to the right front wheel FR and the left rear wheel RL, respectively. ④ being provided to the brake motors 50 and 52 provided to the left front wheel FL and the right rear wheel RR, respectively.

According to the above-mentioned order, a temperature of the brake motors to which the minimum motor current IM()MIN is provided can be decreased. Thus, according to the electric brake apparatus of the present embodiment, overheating of the brake motor 46, 48, 50 and 52** can be prevented and the vehicle can be maintained in a stopped state without consuming unnecessary power.

It should be noted that combinations of wheels are not limited to the above-mentioned combinations. That is, the minimum motor current IM()MIN may be provided to a pair made by the left front wheel FL and the right rear wheel RR and another pair made by the right front wheel FR and a left rear wheel RL. Alternatively, the minimum motor current IM()MIN may be individually provided to each of the four wheels. Additionally, in the above-mentioned embodiment, although the minimum motor current IM()MIN is provided in the above-mentioned order ① to ④, the order of supply of the minimum motor current IM()MIN is not limited to this order and the minimum motor current may be provided according to other orders.

It should be noted that in the above-mentioned embodiment, although a degree of braking operation of the brake pedal 12 performed by the driver is detected by the pedal stroke S, a method for detecting a degree of the brake operation is not limited to this and a degree of braking operation may be detected based on a brake pressing force by detecting the brake pressing force by using a brake pressing force sensor.

Additionally, in the above-mentioned embodiment, although the supply of the motor current IM() is stopped by setting the rely units provided in the drive circuits 38 and 40 to an interruption state when a collision of the vehicle is detected, a method for stopping the supply of the motor current is not limited to this. For example, a relay unit may be provided between the first battery 42 and the drive circuit 38 and between the second battery 44 and the drive circuit 40 so as to stop the supply of the motor current IM() by interrupting the realty units when a collision of the vehicle is detected.

Additionally, in the above-mentioned embodiment, when an unnecessarily large degree of brake operation is detected for a long time when the vehicle is being stopped, the motor current IM() is changed to the minimum motor current IM()MIN. However, the present invention is not limited to this method, and the motor current IM(**) may be reduced when the above-mentioned condition is recognized.

Further, in the above-mentioned embodiment, although the decrease counter CRED is increased after it is determined that both the condition ① (S>S0) and the condition ② (SPD=0) are established, the present invention is not limited to this method and the decrease counter may be increased after the pedal switch outputs the ON signal. In this case, the motor current IM(**) is reduced at a time when it is determined that both the condition ① (S>S0) and the condition ② (SPD=0) are established after the decrease counter CRED reaches the predetermined value C0.

As mentioned above, in the present embodiment, each of the brake motors 46 to 52 comprises an ultrasonic motor. Accordingly, when the vehicle is stopped with a large brake force, a brake sufficient for the vehicle to be maintained in the stopped state can be obtained without consuming further power after the motor current IM(**) is reduced. Thus, according to this method, the energy-saving effect of the electric brake apparatus can be further improved.

Figure 3:
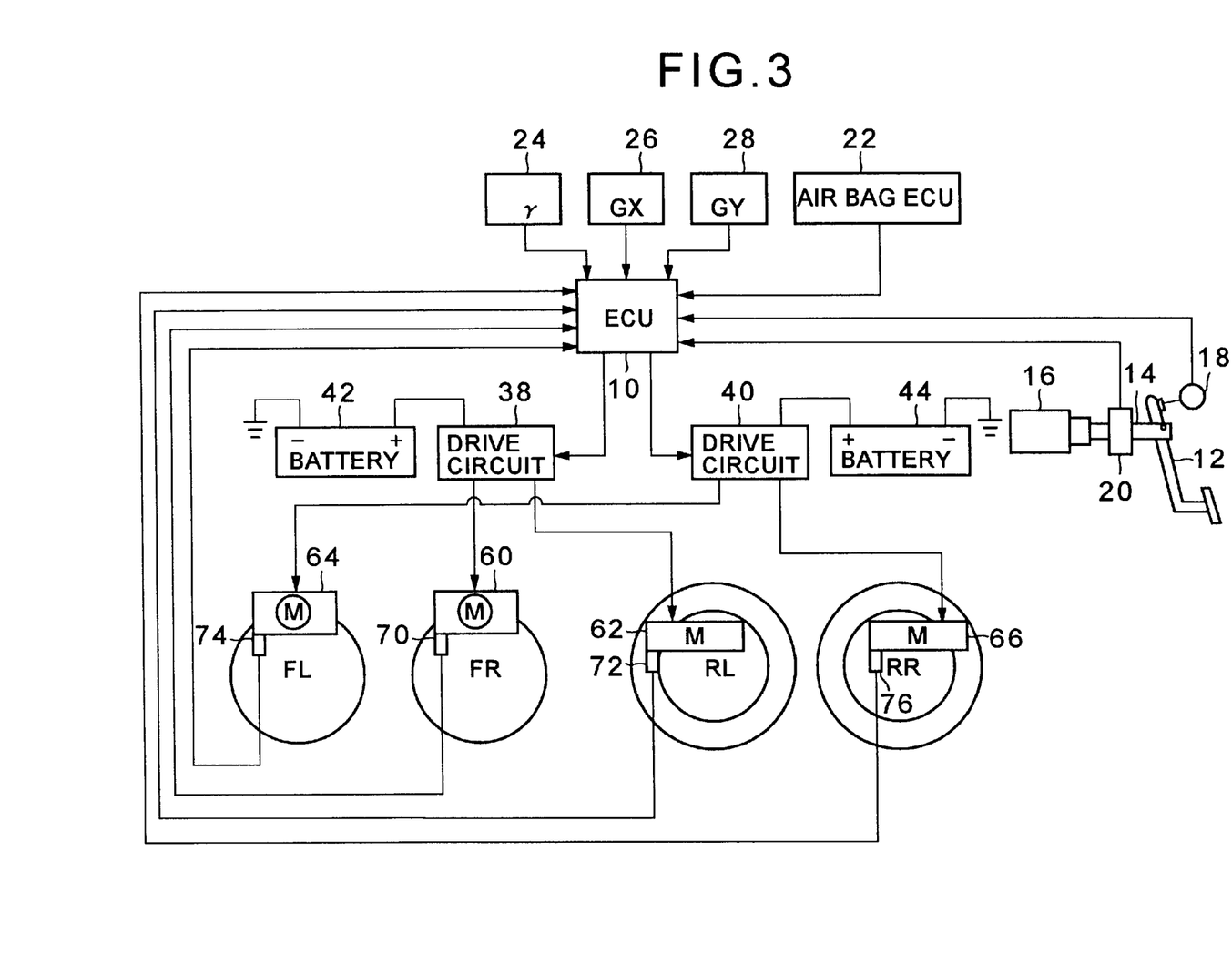
FIG. 3 is a system structure diagram of an electric brake apparatus according to a second embodiment of the present invention.

A description will now be given, with reference to FIG. 3 and FIG. 4 in addition to FIG. 1 and FIG. 2, of a second embodiment of the present invention. FIG. 3 is a system structure diagram of an electric brake apparatus according to the second embodiment of the present invention. In FIG. 3, parts that are the same as the parts shown in FIG. 1 are given the same reference numerals, and descriptions thereof will be omitted. The electric brake apparatus according to the present embodiment is achieved by the electric brake apparatus according to the first embodiment shown in FIG. 1 in which brake motors 60 to 66 each of which comprises a direct current motor are used instead of the brake motors 46 to 52 and temperature sensors 70, 72, 74 and 76 are provided to the brake motors 60 to 66, respectively.

As mentioned above, each of the brake motors 60 to 66 comprises a direct current motor. Thus, in the present embodiment, when the motor current is provided to the brake motors 60 to 66, a torque proportional to the motor current is generated. Each of the temperature sensors 70 to 76 outputs an electric signal corresponding to a temperature of the respective brake motors 60 to 66. Each of the temperature sensors 70 to 76 is connected to the ECU 10. The ECU 10 detects a temperature of each of the brake motors 60 to 66 based on the output signals of the temperature sensors 70 to 76.

Figure 4:
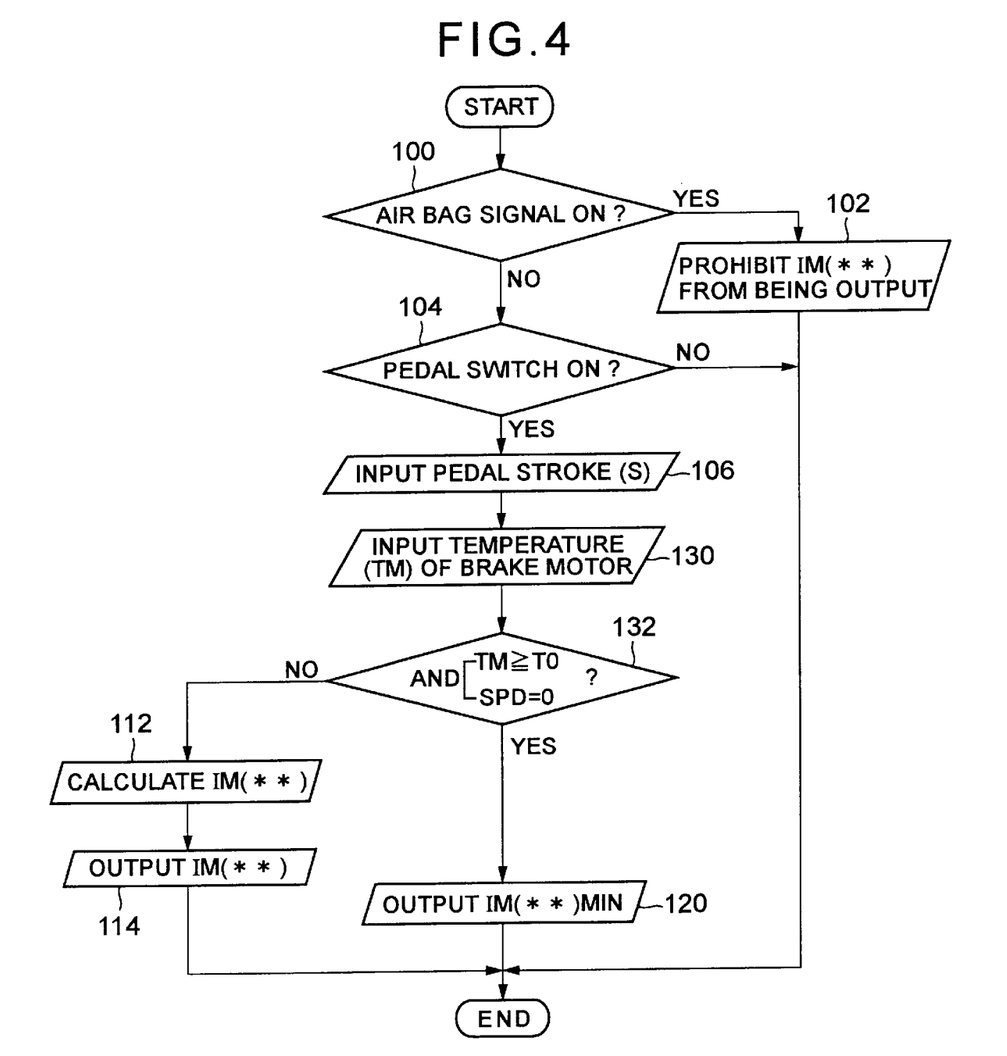
FIG. 4 is a flowchart of a main routine performed by an electric brake apparatus according to a second embodiment of the present invention.

FIG. 4 is a flowchart of a main routine performed by the ECU 10 provided in the electric brake apparatus according to the present embodiment. The electric brake apparatus according to the present embodiment is achieved by the ECU 10 performing a series of processes instead of the series of processes shown in FIG. 2. The routine shown in FIG. 4 is a periodic interruption routine repeatedly started at every predetermined time. It should be noted that, in FIG. 4, steps that perform the same process as the steps shown in FIG. 2 are given the same reference numerals, and descriptions thereof will be omitted.

In the routine shown in FIG. 4, after the pedal stroke S is detected based on the output signal of the stroke sensor 20 in step 106, the process of step 130 is performed subsequently.

In step 130, a temperature TM of each of the brake motors 60 to 66 is detected based on the output signal of the temperature sensor.

In step 132, it is determined whether or not ① the temperature of each of the brake motors 60 to 66 exceeds a predetermined value T0 and ② a vehicle speed SPD is equal to "0". The predetermined value T0 is a maximum temperature at which the brake motors 60 to 66 operate normally.

If it is determined that the above-mentioned condition (TM≧T0) is not established, it can be determined that the motor current IM() corresponding to the pedal stroke S can be continuously provided to the brake motors 60 to 66 without overheating the brake motors 60 to 66. If such a determination is made in step 132, the process of step 112** is performed subsequently.

On the other hand, if it is determined that both the condition ① (TM≧T0) and the condition ② (SPD=0) are established. The process of step 120 is then performed.

According to the above-mentioned process, when the vehicle is stopped and the brake motors 60 to 66 are at a high temperature, the motor current IM() can be forcibly reduced to the minimum motor current IM()MIN. Thus, according to the electric brake apparatus of the present embodiment, when the temperature of the brake motors 60 to 66 returns to a low temperature, or when the vehicle starts to move, a brake force corresponding to the pedal stroke S can be generated.

It should be noted that, in the present embodiment, although the motor current is reduced in response to the temperature TM of the brake motors 60 to 66, a method for controlling the motor current is not limited to this method and the motor current may be controlled in response to a temperature of each of the drive circuits 38 and 40 which drives the brake motors 60 to 66.

A description will now be given, with reference to FIG. 5 in addition to FIG. 4, of a third embodiment of the present invention. In the above-mentioned second embodiment, a temperature of each of the brake motors 60 to 66 is directly measured by using the temperature sensor. On the other hand, in an electric brake apparatus of this third embodiment, a temperature of each of the brake motors 60 to 66 is recognized by detecting the motor current IM() provided to the brake motors 60 to 66**. The present embodiment is characterized in this point.

Figure 5:
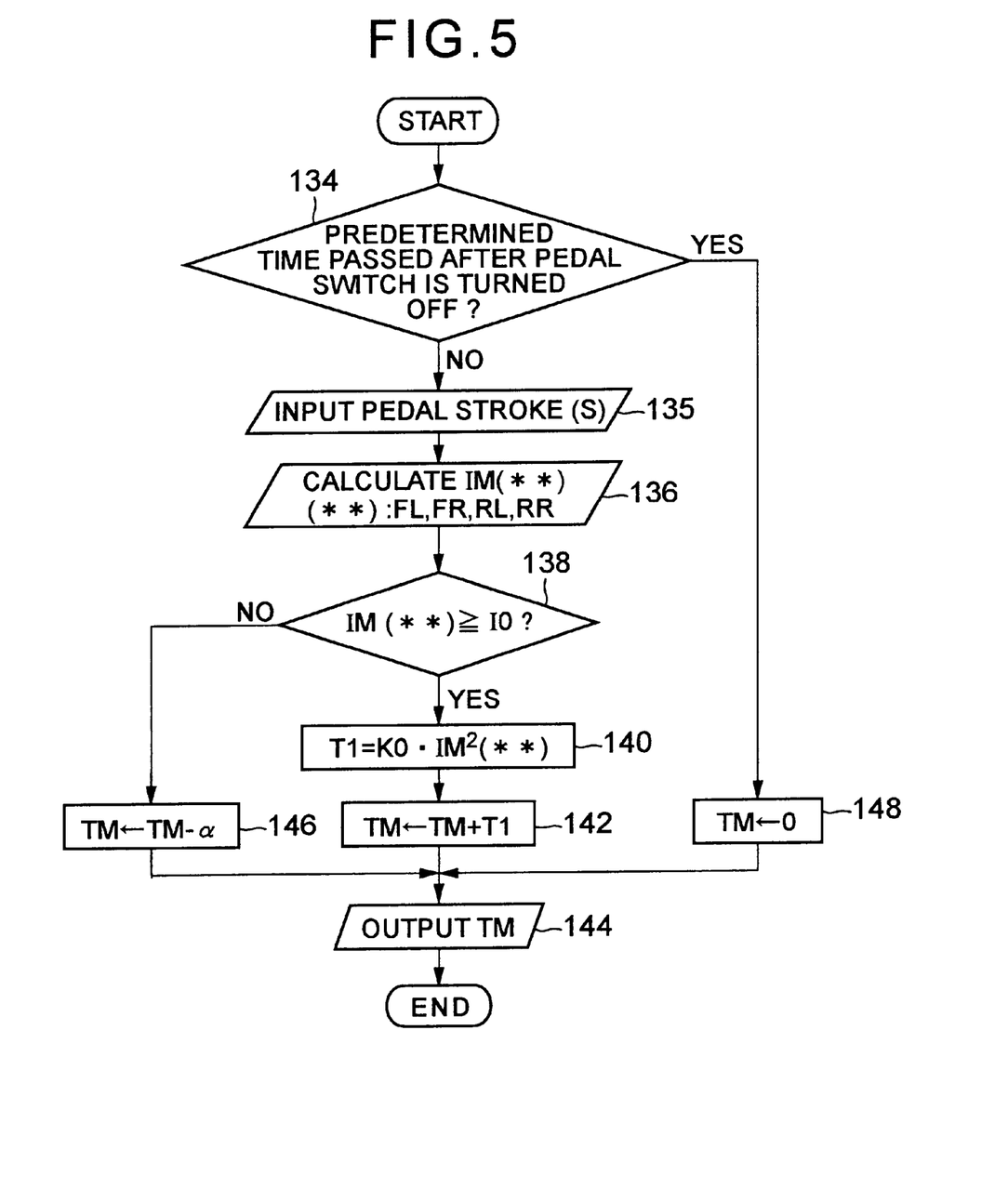
FIG. 5 is a flowchart of a control routine performed by an electric brake apparatus according to a third embodiment of the present invention for detecting a temperature of a brake motor.

FIG. 5 is a flowchart of an example of a control routine performed by the ECU 10 provided in the electric brake apparatus according to the present embodiment so as to achieve the above-mentioned functions. The routine shown in FIG. 5 is a periodic interruption routine repeatedly started at every predetermined time. When the routine shown in FIG. 5 is started, the process of step 134 is performed first.

In step 134, it is determined whether or not the pedal switch is not outputting the ON signal, that is, whether or not a predetermined time has passed after the pedal switch 18 is turned off. The predetermined time is a period for decreasing a temperature of each of the brake motors 60 to 66 after the supply of the motor current TM() to the brake motors 60 to 66 is stopped. If it is determined that the above-mentioned condition is not established, the process of step 135** is then performed.

In step 135, the pedal stroke S is detected based on the output signal of the stroke sensor 20.

In step 136, the motor current IM() to be provided to each of the brake motors 60 to 66 is calculated based on the pedal stroke S detected in step 135**.

In step 138, it is determined whether or not the motor current IM() is equal to or greater than a predetermined value I0. The predetermined value I0 is a minimum motor current by which the brake motors 60 to 66** are overheated.

If it is determined, in step 138, that the above-mentioned condition (IM()≧I0) is established, it can be determined that a large motor current IM() sufficient for overheating the brake motors 60 to 66 is supplied to the brake motors 60 to 66. If such a determination is made in step 138, the process of step 140 is performed subsequently.

In step 140, a process for converting the motor current IM() calculated in step 136 into a temperature increase value T1 generated in the brake motors 60 to 66 is performed. As mentioned above, each of the brake motors 60 to 66 comprises a direct current motor. Accordingly, an increase in temperature T1 of the brake motors 60 to 66 is proportional to a square of the motor current IM() flowing to the brake motors 60 to 66. Thus, specifically, the increase in temperature increase is calculated by the following equation.

$$T1 = K0 \cdot (IM(**))^2 \qquad (1)$$

Where, K0 is a proportion constant.

In step 142, a process for increasing the temperature TM of the brake motors 60 to 66 by the value T1 calculated in step 140 is performed. According to the above-mentioned process, the temperature of the brake motors 60 to 66 can be recognized according to the motor current IM() provided to the brake motors 60 to 66 after the condition of step 138** is established.

In step 144, a process for outputting a value which is recognized as the temperature TM of the brake motors 60 to 66 is performed.

If it is determined, in step 138, that the condition (IM()≧I0) is not established, it can be determined that the motor current IM() provided to the brake motors 60 to 66 is not so large that it overheats the brake motors 60 to 66. In such a case, it can be determined that the temperature TM of the brake motors 60 to 66 will decrease. Accordingly, when such a determination is made in step 138, the process of step 146 is then performed.

In step 146, a process for decreasing the temperature TM of the brake motors 60 to 66 by a is performed.

If it is determined, in step 134, that the time during which the pedal switch maintains the OFF state exceeds a predetermined time period, it can be determined that a braking operation has not been performed for a long time. In this case, it can be determined that the temperature of the brake motors 60 to 66 has been decreased. Accordingly, if such a determination is made in step 134, the process of step 148 is performed subsequently.

In step 148, a process for resetting the temperature of the brake motors 60 to 66 to "0".

According to the above-mentioned process, the temperature of the brake motors 60 to 66 can be recognized according to the motor current IM(**) calculated based on the pedal stroke S and provided to the brake motors 60 to 66. Thus, according to the present embodiment, the same effects as that of the above-mentioned second embodiment can be obtained by using the thus-recognized temperature TM of the brake motors 60 to 66 in step 130.

Additionally, in the above-mentioned embodiment, temperature sensors for detecting the temperature of the brake motors 60 to 66 are not provided. Thus, according to the present embodiment, the same effects as that of the second embodiment can be obtained with a simple structure as compared to the second embodiment.

It should be noted that, in the above-mentioned embodiment, although the temperature of the brake motors 60 to 66 is recognized by detecting the motor current IM(**) provided to the brake motors 60 to 66, the method for recognizing the temperature of the brake motors is not limited to this method and the brake motors 60 to 66 may be recognized according to instruction signals provided from the ECU 10 to the drive circuits 38 and 40.

Additionally, in the above-mentioned embodiment, although the temperature of the brake motors 60 to 66 is recognized by detecting the motor current IM() provided to the brake motors 60 to 66, the temperature of the drive circuits 38 and 40 may be recognized by the motor current IM().

A description will now be given, with reference to FIG. 6 in addition to FIG. 2, of a fourth embodiment of the present invention. An electric brake apparatus according to the present embodiment has a feature in that the brake motors 60 to 66 are provided similar to the second embodiment and the temperature of the brake motors 60 to 66 or the temperature of the drive circuits 38 and 40 is assumed based on instruction signals provided from the ECU 10 to the drive circuits 38 and 40. The feature of the present embodiment is described below.

Figure 6:
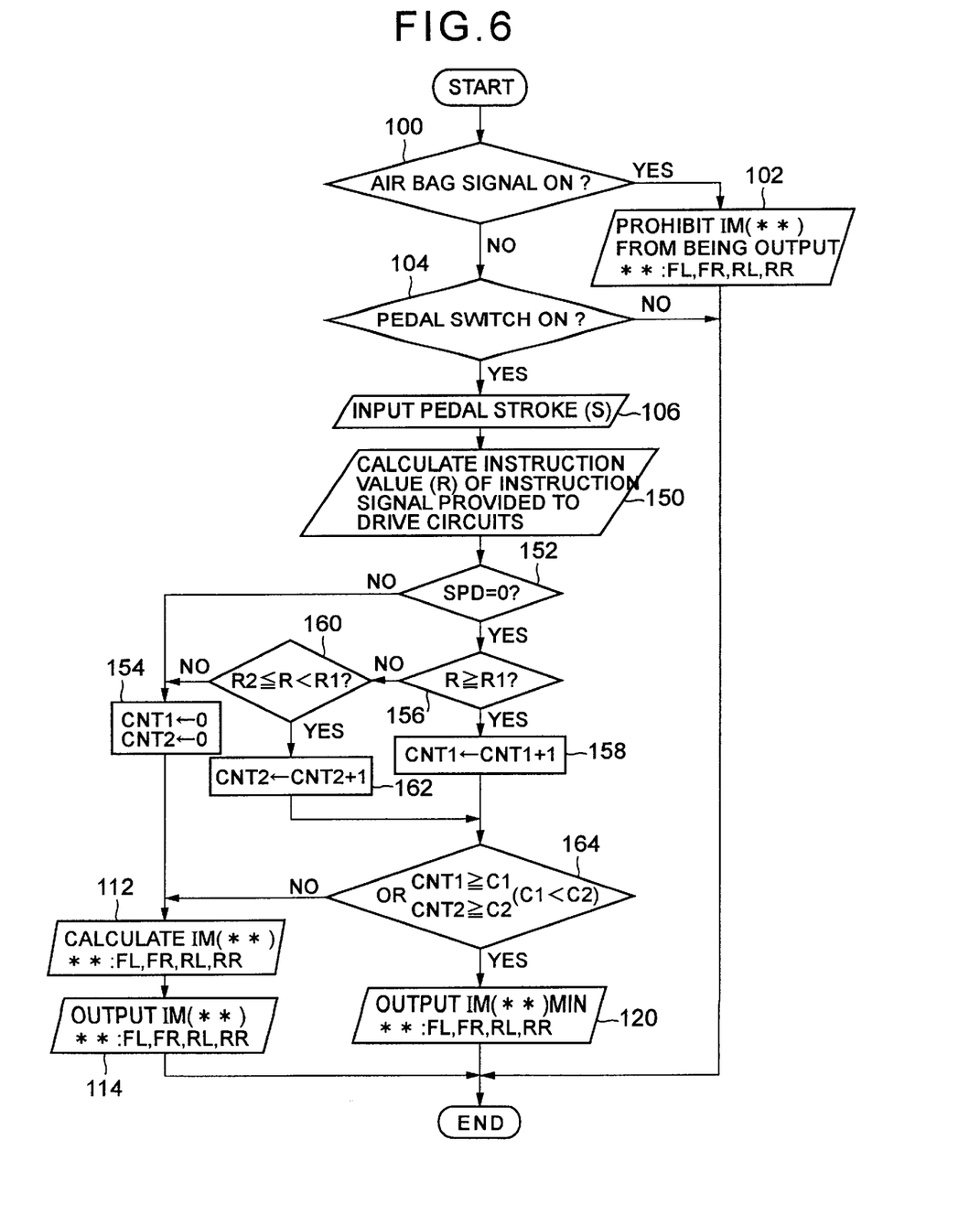
FIG. 6 is a flowchart of a main routine performed by an electric brake apparatus according to a fourth embodiment of the present invention.

FIG. 6 is a flowchart of an example of a main routine performed by the ECU 10 provided in the electric brake apparatus according to the present embodiment. The electric brake apparatus according to the present embodiment is achieved by the ECU 10 performing a series of processes shown in FIG. 6 instead of the series of processes shown in FIG. 2. The routine shown in FIG. 6 is a periodic interruption routine repeatedly started at every predetermined time. It should be noted that, in FIG. 6, the steps that perform the same process as the steps shown in FIG. 2 are given the same reference numerals, and descriptions thereof will be omitted.

In the routine shown in FIG. 6, after the pedal stroke S is detected, in step 106, based on the output signal of the stroke sensor 20, the process of step 150 is performed subsequently.

In step 150, an instruction value R of the instruction signal provided from the ECU 10 to the drive circuits 38 and 40 is calculated so that a brake force required by a driver based on the pedal stroke S is generated in the vehicle and a ratio of a brake force of the front wheels to a brake force of the rear wheels is a predetermined ratio.

In step 152, it is determined whether or not the vehicle speed SPD is "0". If this condition is not established, it can be determined that the vehicle is moving. When the vehicle is moving, it is appropriate to generate a brake force corresponding to the pedal stroke S. Accordingly, if the above-mentioned condition is not established, it can be determined that it is appropriate to maintain the motor current IM(**) at a value corresponding to the pedal stroke S. If it is determined, in step 152, that the above-mentioned condition is not established, the process of step 154 is performed subsequently.

In step 154, a process for resetting decrease counters CNT1 and CNT2 to "0" is performed. The decrease counter CNT1 is a counter for counting a time period during which the condition of step 156 is continuously established. Additionally, the decrease counter CNT2 is a counter for counting a time period during which the condition of step 160 is continuously established. After the process of step 154 is completed, the process of step 112 is performed. Thereafter, a process for providing the motor current IM(**) calculated based on the pedal stroke S to the brake motors 60 to 66 is performed.

If it is determined, in step 152, that the condition (SPD=0) is established, the process of step 156 is performed subsequently.

In step 156, it is determined whether or not the instruction value R of the instruction signal used in step 150 is equal to or greater than a first predetermined value R1. The first predetermined value R1 is a minimum instruction value by which the brake motors 60 to 66 are overheated in a short time.

If it is determined, in step 156, that the above-mentioned condition is established, it can be determined that an unnecessarily large instruction signal is provided after the vehicle is stopped. In such a case, it can be determined that the brake motors 60 to 66 are overheated when such a condition is continued for only a short time. Accordingly, if such a determination is made in step 156, the process of step 158 is performed subsequently.

In step 158, a process for increasing the decrease counter CNT1 is performed. According to the above-mentioned process, the decrease counter CNT1 indicates an elapsed time after the condition of step 156 is established.

On the other hand, if it is determined, in step 156, that the above-mentioned condition is not established, it can be determined that the brake motors 60 to 66 are not overheated in a short time. Accordingly, if such a determination is made in step 156, the process of step 160 is performed subsequently.

In step 160, it is determined whether or not the instruction value R of the instruction signal used in step 150 is equal to or greater than a second predetermined value R2 and is smaller than the first predetermined value R1. The second predetermined value R2 is a minimum instruction value by which the brake motors 60 to 66 are not overheated when the motor current corresponding to the second predetermined value is continuously provided for a long time, and is set to a value smaller than the first predetermined value R1.

If it is determined, in step 160, that the above-mentioned condition is not established, it can be determined that the instruction value R of the instruction signal is a value which cannot overheat the brake motors 60 to 66. Accordingly, if the above-mentioned condition is not established, it can be determined that the motor current IM(**) corresponding to the pedal stroke S can be continuously provided to the brake motors 60 to 66. Accordingly, if such a determination is made in step 160, the process of step 154 is performed subsequently.

On the other hand, if it is determined, in step 160, that the above-mentioned condition is established, it can be determined that a relatively large instruction signal is unnecessarily provided after the vehicle is stopped. In such a case, it can be determined that the brake motors 60 to 66 are overheated when such a condition is continued for a long time. Accordingly, if such a determination is made in step 160, the process of step 162 is performed subsequently.

In step 162, a process for increasing the decrease counter CNT2 is performed. According to the above-mentioned process, the decrease counter CNT2 indicates an elapsed time after the condition of step 160 is established.

In step 164, it is determined whether or not a count value of the decrease counter CNT1 reaches a predetermined value C1 or a count value of the decrease counter CNT2 reaches a predetermined value C2. The predetermined value C2 is set to a value greater than the predetermined value C1 since the instruction value R satisfying the condition of step 160 is smaller than the instruction value satisfying the condition of step 156.

As a result of the process of step 164, if it is determined that both CNT1≧C1 and CNT2≧C2 are not established, the process of step 112 is then performed. On the other hand, if it is determined that CNT1≧C1 or CNT2≧C2 is established, the process of step 120 is performed.

According to above-mentioned process, the motor current IM() can be forcibly reduced to the minimum motor current IM()MIN by regarding a state in which a large instruction value R of the instruction signal is provided to the drive circuits 38 and 40 as a state in which the brake motors 60 to 66 or the drive circuits 38 and 40 are overheated. Thus, according to the electric brake apparatus of the present embodiment, the vehicle can be maintained in a stopped state without unnecessarily consuming a power and the brake motors can be prevented from being overheated.

Additionally, according to the above-mentioned embodiment, when a large instruction value of the instruction signal is not provided to the drive circuits 38 and 40 or when the vehicle starts to move, the motor current IM() can be changed from the minimum motor current IM() MIN to an ordinary value. When the large instruction value R of the instruction signal is not continuously provided to the drive circuits 38 and 40, it can be determined that the motor current IM() being provided is not so large as to overheat the brake motors 60 to 66**. Additionally, when the vehicle starts to move, it is appropriate to generate a brake force corresponding to the pedal stroke S. Thus, according to the electric brake apparatus of the present embodiment, a brake force corresponding to the pedal stroke S can be generated in the above-mentioned condition.

In the above-mentioned embodiment, although the predetermined time period until the motor current IM() is reduced is divided into two stages in response to a magnitude of the instruction value R of the instruction signal provided to the drive circuits 38 and 40, the method for reducing the motor current IM() is not limited to this method and the time period may be divided into three stages. In this case, the predetermined time period until the motor current IM(**) is reduced is decreased as the instruction value R of the instruction signal is increased.

Additionally, in the above-mentioned first to fourth embodiments, although the vehicle is in a stopped state when the vehicle speed SPD is "0", the method for determining the stopped state of the vehicle is not limited to this method and it may be determined that the vehicle is in a stopped state when the vehicle continuously moves at an extremely low speed (SPD≦3 km/h) for a predetermined time period.

The present invention is not limited to the specifically disclosed embodiments, and variations and modifications may be made without departing from the scope of the present invention.

The present application is based on Japanese priority applications No. 9-346759 filed on Dec. 16, 1997 and No. 10-179191 filed on Jun. 25, 1998, the entire contents of which are hereby incorporated by reference.

What is claimed is:

1. An electric brake apparatus having a brake actuator generating a brake force, said brake actuator using a brake motor system including a brake motor as a power source, said electric brake motor comprising:

normal control means for controlling a motor current provided to said brake motor so as to generate a brake force required for a vehicle;

motor current reducing means for reducing the motor current controlled by said normal control means under a predetermined condition; and wherein said motor current reducing means reduces the motor current controlled by said normal control means when the brake system is in a condition in which overheating occurs.

2. The electric brake apparatus as claimed in claim 1, wherein said motor current reducing means reduces the motor current controlled by said normal control means when said brake motor is continuously driven for a period exceeding a predetermined period.

3. The electric brake apparatus as claimed in claim 1, wherein said motor current reducing means reduces the motor current controlled by said normal control means when said brake motor is continuously driven for a period exceeding a predetermined period while generating a torque exceeding a predetermined value.

4. The electric brake apparatus as claimed in claim 1, wherein said brake motor system includes a plurality of brake motors, and said motor current reducing means reduces the motor current provided to a part of said plurality of brake motors.

5. The electric brake apparatus as claimed in claim 1, further including a stopped state determining means for determining whether or not said vehicle is in a stopped state, wherein if said stopped state determining means determines the vehicle is stopped, said motor current reducing means reduces the motor current controlled by said normal control means when the brake system is in a condition in which overheating occurs.

6. An electric brake apparatus having a brake actuator generating a brake force, said brake actuator using a brake motor system including a brake motor as a power source, said electric brake motor comprising:

normal control means for controlling a motor current provided to said brake motor so as to generate a brake force required for a vehicle;

motor current reducing means for reducing the motor current controlled by said normal control means under a predetermined condition;

temperature detecting means for detecting a temperature of one of said brake motor and a drive circuit driving said brake motor, and wherein said motor current reducing means reduces the motor current controlled by said normal control means when the temperature of one of said brake motor and said drive circuit is equal to or greater than a predetermined value.

7. The electric brake apparatus as claimed in claim 6, wherein said brake motor system includes a plurality of brake motors, and said motor current reducing means reduces the motor current provided to a part of said plurality of brake motors.

8. The electric brake apparatus as claimed in claim 6, further including a stopped state determining means for determining whether or not said vehicle is in a stopped state, wherein if said stopped state determining means determines the vehicle is stopped, said motor current reducing means reduces the motor current controlled by said normal control means when the temperature of one of said brake motor and said drive circuit is equal to or greater than a predetermined value.

9. An electric brake apparatus having a brake actuator generating a brake force, said brake actuator using a brake motor system including a brake motor as a power source, said electric brake motor comprising:

normal control means for controlling a motor current provided to said brake motor so as to generate a brake force required for a vehicle;

motor current reducing means for reducing the motor current controlled by said normal control means under a predetermined condition; and stopped state determining means for determining whether or not said vehicle is in a stopped state, wherein said motor current reducing means reduces the motor current controlled by said normal control means when said vehicle is determined to be in the stopped state.

10. The electric brake apparatus as claimed in claim 9, further comprising motor current increasing means for increasing the motor current being provided to said brake motor when said vehicle is not in the stopped state in a condition in which the motor current is reduced by said motor current reducing means.

11. The electric brake apparatus as claimed in claim 9, wherein said brake motor system includes a plurality of brake motors, and said motor current reducing means reduces the motor current provided to a part of said plurality of brake motors.

12. An electric brake apparatus having a brake actuator generating a brake force, said brake actuator using a brake motor system including a brake motor as a power source, said electric brake motor comprising:

normal control means for controlling a motor current provided to said brake motor so as to generate a brake force required for a vehicle;

motor current reducing means for reducing the motor current controlled by said normal control means under a predetermined condition; and wherein said brake motor system includes a plurality of brake motors, and said motor current reducing means reduces the motor current provided to a part of said plurality of brake motors.

13. The electric brake apparatus as claimed in claim 12, further including a stopped state determining means for determining whether or not said vehicle is in a stopped state, wherein if said stopped state determining means determines the vehicle is stopped, said motor current reducing means reduces the motor current provided to a part of said plurality of brake motors.

14. An electric brake apparatus having a brake actuator generating a brake force, said brake actuator using a brake motor system including a brake motor as a power source, said electric brake motor comprising:

normal control means for controlling a motor current provided to said brake motor so as to generate a brake force required for a vehicle;

motor current reducing means for reducing the motor current controlled by said normal control means under a predetermined condition; and collision detecting means for detecting a collision of said vehicle, wherein said motor current reducing means cuts the motor current when a collision of said vehicle is detected.

* * * * *